US012761017B2

(12) United States Patent
Peters et al.

(10) Patent No.: US 12,761,017 B2

(45) Date of Patent: Oct. 13, 2026

(54) MEASURING PANEL FOR VEHICLE MEASUREMENT

(71) Applicant: Beissbarth GmbH, Munich (DE)

(72) Inventors: Stefanie Peters, Munich (DE); Simone Graf, Munich (DE); Christof Krüger, Munich (DE)

(73) Assignee: BEISSBARTH GMBH, Munich (DE)

( * ) Notice: Subject to any disclaimer, the term of this patent is extended or adjusted under 35 U.S.C. 154(b) by 859 days.

(21) Appl. No.: 18/023,191

(22) PCT Filed: Aug. 26, 2021

(86) PCT No.: PCT/EP2021/073606

§ 371 (c)(1),
(2) Date: Feb. 24, 2023

(87) PCT Pub. No.: WO2022/043436

PCT Pub. Date: Mar. 3, 2022

(65) Prior Publication Data

US 2023/0296375 A1 Sep. 21, 2023

(30) Foreign Application Priority Data

Aug. 28, 2020 (DE) .................... 10 2020 122 565.2

(51) Int. Cl.
*G01B 11/275* (2006.01)
*G06K 19/06* (2006.01)

(52) U.S. Cl.
CPC ...... *G01B 11/275* (2013.01); *G06K 19/06009* (2013.01); *G01B 2210/30* (2013.01)

(58) Field of Classification Search
CPC .............. G01B 11/275; G01B 2210/30; G06K 19/06009
See application file for complete search history.

(56) References Cited

U.S. PATENT DOCUMENTS 6,134,792 A † 10/2000 January
6,690,456 B2 * 2/2004 Bux .................. G01B 11/2755 356/139.09

(Continued)

FOREIGN PATENT DOCUMENTS

CN 106289116 B 10/2018
DE 102013211210 A1 12/2014

(Continued)

OTHER PUBLICATIONS

English language Abstract of CN106289116.

(Continued)

*Primary Examiner* — Yuqing Xiao
*Assistant Examiner* — Jempson Noel
(74) *Attorney, Agent, or Firm* — William J. Barber; WARE FRESSOLA MAGUIRE & BARBER LLP

(57) ABSTRACT

A measurement panel (8) for the optical measurement or calibration of a vehicle component, in particular a wheel system or driver assistance system, comprises at least one optical feature (30, 32) and at least one optically detectable information carrier (34) of measurement panel information relating to the measurement panel (8) itself. The at least one optical feature (30, 32) is formed on or attached to a front side of the measurement panel (8), and the at least one optically detectable information carrier (34) is formed on or attached to a rear side of the measurement panel (8).

20 Claims, 5 Drawing Sheets

(56) References Cited

U.S. PATENT DOCUMENTS

| | | | | |
|---|---|---|---|---|
| 7,313,869 | B1 * | 1/2008 | Rogers | H04N 7/183 33/203.18 |
| 8,341,848 | B2 † | 1/2013 | Stieff | |
| 2004/0244463 | A1 * | 12/2004 | Dale, Jr. | G01B 11/275 73/1.75 |
| 2024/0294176 | A1 * | 9/2024 | Corghi | G01B 11/275 |

FOREIGN PATENT DOCUMENTS

| | | | |
|---|---|---|---|
| DE | 102018108042 | A1 | 10/2019 |
| DE | 102018215318 | A1 | 3/2020 |
| WO | 2019/110245 | A1 | 6/2019 |

OTHER PUBLICATIONS

English language Abstract of DE102013211210.
English language Abstract of DE102018108042.
English language Abstract of DE102018215318.

* cited by examiner
† cited by third party

MEASURING PANEL FOR VEHICLE MEASUREMENT

The present invention relates to a measurement panel for the optical measurement and/or calibration of a vehicle component, in particular a chassis or wheel system, of a motor vehicle. The invention also relates to a device and a method for the optical measurement and/or calibration of a vehicle component using a measurement panel designed according to the invention.

For optical measurement and/or calibration of a vehicle component, in particular a chassis or wheel system, of a motor vehicle, measuring heads are regularly used which capture images of measurement panels attached to the wheels of the motor vehicle. The measurement panels contain optical features that form a measurement mark pattern, for example. In this way, for example, relevant parameters of the wheel system of the measured motor vehicle can be determined, e.g. camber, toe or rim impact values. Such measurement panels can also be used to calibrate a component of a driver assistance system, for example a sensor/camera, of a driver assistance system.

An optical feature is a feature in a mark pattern that can be detected optically and whose parameters can be determined algorithmically. Optical features can be, for example, significant points, such as centers, corners or intersections of geometric objects, but also gray value or pattern-dependent texture features. For example, a measurement mark pattern may include separate, touching, intersecting, ordered or disordered elements, or one or more complex structures whose parameters significant to the measurement cannot be readily detected by a human being.

In order to be able to perform the optical measurement and/or calibration of a vehicle component with measuring heads that observe the measurement panels with only one camera, parameters of the optical measurement mark patterns formed on the measurement panels, which describe the arrangement of the optical features within the measurement mark patterns, must be known with a high degree of accuracy and must be taken into account in the evaluation of the captured images.

It is therefore an object of the present invention to provide measurement panels for the optical measurement and/or calibration of a vehicle component, which make it possible to make the parameters of the optical measurement mark patterns formed on the measurement panels known to the measuring heads in simple and reliable manner.

This object is met by the subject matter of independent patent claim 1. Advantageous further embodiments are indicated in the dependent claims.

A measurement panel according to the invention for the optical measurement and/or calibration of a vehicle component, in particular for the measurement of a chassis or wheel system of a motor vehicle, comprises at least one optical feature and at least one optically detectable information carrier of measurement panel information relating to the measurement panel itself. The at least one optical feature is formed on or attached to a front side of the measurement panel, and the at least one optically detectable information carrier is formed on or attached to a rear side of the measurement panel.

By optically detecting, reading and evaluating the optically detectable information carrier, the measurement panel information, which contains, for example, parameters of the measurement mark pattern formed on the respective measurement panel, can be made known to the measuring heads in simple and reliable manner. In particular, transmission errors that can occur during manual transmission of the measurement panel information to the measuring heads can be reliably avoided.

Due to the fact that the at least one optically detectable information carrier is formed on or attached to the rear side of the measurement panel, the optically detectable information carrier is independent of the at least one optical feature, in particular the measurement mark pattern which comprises one or more optical features and which is formed on a front side of the measurement panel. Therefore, the optical features or the optical measurement mark pattern are not affected by the optically detectable information carrier, and the area of the measurement panel does not need to be enlarged to accommodate the optically detectable information carrier on the measurement panel in addition to the measurement mark pattern without affecting the optical features or the measurement mark pattern.

The at least one optically detectable information carrier may include an arbitrary selection and/or combination of the measurement panel information listed below.

A first item of measurement panel information can define a product identifier ("type"). When using different measurement panels for different measurement tasks, the product identifier can be used to automatically control the measurement sequence by attaching the respective required measurement panel. For example, by changing the measurement panels in a running vehicle measurement, it is possible to automatically switch to a program for adjusting a driver assistance system. But even without automatic sequence control, the use of the correct measurement panels for the measurement task can be checked via the product identifier, thus avoiding incorrect operation.

The product identifier also enables the wheel alignment measurement system to use different measurement panels for one and the same measurement task. This is particularly advantageous if, in the course of further product development, the measurement panels are technically modified and it is necessary to adapt the parameters for the measurement. Within the scope of software updates, the wheel alignment measurement system can be continuously extended by product identifiers of new measurement panels and their associated parameters.

If there is more than one measurement panel with different measurement mark patterns, the visual determination of the optical characteristics can be simplified with the aid of a product identifier.

Second measurement panel information may contain an individual identifier, for example a serial number. An individual identifier on the measurement panel can allow the software to automatically assign stored parameters to the measurement panel. For example, the measurement panel parameters may be downloaded from a server where the parameters of a plurality of measurement panels are stored. If an assignment cannot be made, it may be provided that an error message is generated to prevent an incorrect measurement.

In this way, low-cost, measured or gauged measurement panels can also be used safely in mono-camera systems. Erroneous measurements caused by missing or incorrectly assigned parameters of the measurement panels can be prevented by automatically assigning the parameters to the associated measurement panels.

In addition, the measurement panels can be automatically checked for suitability by means of software, such as e.g. online diagnostics or integrated service tools. This allows the manufacturer to clearly trace the measurement panels and, if necessary, recall them specifically as part of a recall campaign or service exchange.

An individual identification of the measurement panels is also suitable for plausibility checks and/or for sequence control during the so-called "envelope measurement" when checking the accuracy of the system.

Third measurement panel information may contain geometric information about the measurement panel and/or an optical measurement mark pattern formed on the measurement panel. Geometric information about the measurement panel itself or about details of the measurement panel (reference objects), such as the distance between reference points or deviations from a specified reference measurement mark pattern, can be included as parameters or auxiliary parameters in the wheel alignment measurement and thus increase the measurement accuracy. In particular, the measurement panel information can also include the reference of the optical features or the measurement mark pattern to an attachment device designed to attach the measurement panel to a motor vehicle, for example a wheel adapter.

Fourth measurement panel information may define optical characteristics of the measurement panel and/or marks. Knowing optical properties of the measurement panel and the marks, illumination and exposure control can be accelerated in the process flow of a measurement procedure by selecting suitable start parameters and optimizing the iteration procedure. Additional information such as e.g. the optical properties of an optional transparent protective screen/layer applied to the pattern, e.g. its thickness and/or refractive index for determining the optical refraction of light, can be used to increase the measurement accuracy.

Furthermore, the measurement procedure for the wheel alignment measurement, such as the steering angle and the roll angle, can be adapted to the optical behavior of the reflective marks (e.g. reflectance, angle of reflection, etc.) and thus an optimized and overall faster measurement can be achieved. This is particularly advantageous when optical properties of the optical features and/or measurement panels change in the course of further product development.

In one embodiment, the measurement panel information is encoded in the at least one optically detectable information carrier. In such an embodiment, all measurement panel information is present in or on the measurement panel itself, and no other sources need to be present and read out in order to obtain the desired measurement panel information. This simplifies the handling of the measurement panels, and possible error sources that may result from an incorrect assignment of the information encoded in the optically detectable information carrier to a source can be reliably excluded.

In order to be able to encode all required information in a compact optically detectable information carrier, the measurement panel information can be encoded in the at least one optically detectable information carrier in compressed form.

In one embodiment, the measurement panel information is encoded in a machine-readable form in the at least one optically detectable information carrier so that the measurement panel information can be read from the optically detectable information carrier easily, conveniently, and with a low probability of error.

In one embodiment, the machine-readable form comprises at least one element selected from the group consisting of: alphanumeric symbols or the like, a one-dimensional code, in particular a bar code, or a two-dimensional code, in particular a QR code; or a combination thereof.

Alphanumeric symbols can also be visually detected or recognized by a human being and, if necessary, manually transferred to the measuring heads via an input device. A one-dimensional code, for example a bar code, is particularly easy to read and evaluate by machine. In a two-dimensional code, in particular a QR code, a large amount of data can be encoded on a small area.

In one embodiment, in addition to the at least one optical feature, at least one optical identification pattern is formed on the front side of the measurement panel, which makes it possible to identify the measurement panel with the aid of an image recording device (camera) directed towards the front side of the measurement panel. In this way, the measurement panel can be uniquely identified by means of an image recording device present in a measuring head when the measurement panel is mounted on a vehicle wheel in a measurement position, i.e. in an orientation in which the front side of the measurement panel faces the measuring head.

In one embodiment, the identification pattern comprises a plurality of geometric identification elements, for example circles or polygons, in particular rectangles and/or squares. In one embodiment, the identification pattern comprises a plurality of similar geometric identification elements. Such identification elements can be produced in particularly simple and inexpensive manner.

In one embodiment, the identification elements are formed on the measurement panel in a measurement panel-specific number and/or are arranged on the measurement panel in a measurement panel-specific arrangement, so that the measurement panel can be uniquely identified on the basis of the measurement panel-specific number and/or the measurement panel-specific arrangement of the identification elements. In this way, the measurement panel can be identified by machine with a high degree of reliability.

In one embodiment, a measurement panel includes one or more optically visible areas that can be used for identification. By subsequent individual elimination of the optical visibility, such as covering, physical or chemical destruction of individual areas, the remaining visible arrangement of identification elements may allow a unique identification of the measurement panel.

In one embodiment, the identification elements are arranged on the measurement panel in a vertically, horizontally or diagonally or obliquely aligned row. The identification elements may be arranged on the measurement panel above, below or next to the at least one optical feature. In particular, the identification elements can be arranged on a side (outside) of the at least one optical feature facing away from the motor vehicle when the measurement panel is mounted on the wheel of the vehicle to be measured in a position suitable for wheel alignment measurement.

In one embodiment, the identification features are integrated into the mark pattern. If different mark patterns are formed on different measurement panels, these allow direct identification of the measurement panel and can therefore be used as identification elements.

In one embodiment, the measurement panel includes a first measurement panel element and a second measurement panel element formed separately from the first measurement panel element. In this embodiment, the at least one optical feature and the at least one optically detectable information carrier are formed on the first measurement panel element, and the identification pattern is formed on the second measurement panel element.

In one embodiment, the measurement panel elements are plate-shaped, i.e., substantially two-dimensional. In other words, the width and the height of the measurement panel elements are considerably larger than their thickness, so that the measurement panel elements can be considered as two-dimensional measurement panel elements.

In one embodiment, the measurement panel includes a measurement panel element support or carrier configured to receive the first and second measurement panel elements. In this case, the first and the second measurement panel elements can be attached to and detached from the measurement panel element carrier, in particular independently of each other.

In this way, different measurement mark patterns can be combined with different identification patterns in a measurement panel element carrier to form a measurement panel. In particular, the first measurement panel elements on which the optical features or measurement mark patterns are formed can be easily replaced as required.

In one embodiment, the optical visibility of individual identification elements or areas can be temporarily restricted, for example by covering, or permanently restricted, for example by physical or chemical destruction, to create a unique identification pattern.

In one embodiment, the measurement element carrier is attachable to a vehicle wheel by means of an attachment device, in particular by means of a wheel adapter.

The invention also comprises an attachment device, in particular a wheel adapter, comprising a measurement panel according to the invention, wherein the attachment device is adapted to be attached to a wheel of a motor vehicle in order to position the measurement panel with respect to the wheel of the motor vehicle.

The invention also comprises a device for the optical measurement and/or calibration of a vehicle component, in particular a chassis or wheel system or a driver assistance system, comprising at least one image recording device, at least one image processing unit and at least one measurement panel designed according to the invention. The at least one measurement panel is attachable to a vehicle wheel, in particular using a wheel adapter, and the at least one image recording device is configured to record or capture an image of the optically detectable information carrier of the at least one measurement panel and to transmit the captured image to the at least one image processing unit. The at least one image processing unit is adapted to decode the measurement panel information from the captured image of the optically detectable information carrier by image processing and to use the decoded measurement panel information in a subsequent measurement and/or calibration.

In one embodiment, the device for the optical measurement and/or calibration of a vehicle component comprises at least one measuring head in which at least one image processing unit and at least one image recording device are formed.

In one embodiment, each measuring head comprises two image recording devices, one image recording device provided for capturing an image of a measurement panel attached to a front wheel of a motor vehicle and one image recording device provided for capturing an image of a measurement panel attached to a rear wheel of a motor vehicle.

In one embodiment, the device for the optical measurement and/or calibration of a vehicle component comprises, in particular, two measuring heads which are intended to be arranged on one side of the vehicle each.

In one embodiment, the two measuring heads each comprise a reference system. The reference systems are adapted to determine the position and orientation of the measuring heads relative to one another, so that the captured images of the two measuring heads can be brought into a common coordinate system.

In one embodiment, the device for the optical measurement and/or calibration of a vehicle component comprises a mobile image recording device formed separately from the measuring heads, which is designed to capture an image of the optically detectable information carrier.

With a mobile image recording device, which is formed separately from the measuring heads, the optically detectable information carrier can be conveniently detected in order to make the measuring panel information contained in the optically detectable information carrier known to the device, in particular to a measuring head of the device. The mobile image recording device may be in particular an image recording device (camera) of a mobile input device, for example a smartphone or a tablet PC.

The invention also comprises a method for the optical measurement or calibration of a vehicle component, in particular a chassis or wheel system or a driver assistance system, using at least one measurement panel according to the invention, the method comprising the steps of: attaching the at least one measurement panel to a vehicle wheel or to a measuring means required for calibrating a driver assistance system; capturing an image of the at least one optically detectable information carrier; recognizing and decoding the measurement panel information contained in the image of the at least one optically detectable information carrier; capturing at least one image of the at least one optical feature; and using the measurement panel information in the measurement or calibration of the vehicle component with the aid of the at least one captured image of the at least one optical feature.

In one embodiment, the method comprises capturing the at least one image of the at least one optical feature using a stationary image recording device of a device for the optical measurement and/or calibration of a vehicle component. The stationary image recording device may be in particular a 2D camera of a measuring head.

In one embodiment, the method comprises also capturing the image of the at least one optically detectable information carrier by means of the stationary image recording device. For this purpose, the method comprises turning the measurement panel around and arranging the measurement panel in front of the measuring head such that the optically detectable information carrier formed on the rear side of the measurement panel faces the measuring head and can be detected by a stationary image recording device formed in the measuring head. In this way, costs can be reduced since an additional image recording device for detecting the optically detectable information carrier can be dispensed with.

In one embodiment, the method comprises capturing the image of the at least one optically detectable information carrier by means of a mobile image recording device located outside the measuring heads. In this way, the at least one optically detectable information carrier on the rear side of the measurement panel can be conveniently detected before the measurement panel is mounted to one of the wheels of the motor vehicle or after the measurement panel has been mounted to one of the wheels of the motor vehicle, without the need to arrange the measurement panel in front of one of the measuring heads such that the rear side of the measurement panel faces a measuring head.

In one embodiment, the method comprises assigning the measurement panel information contained in the optically detectable information carrier to an identification pattern;

capturing an image of the identification pattern; identifying the at least one measurement panel using the captured image of the identification pattern; and assigning the measurement panel information contained in the optically detectable information carrier to the measurement panel identified using the identification pattern.

After the measurement panel information contained in the optically detectable information carrier has been assigned to an identification pattern, it is sufficient to detect the identification pattern of a measurement panel that can be easily detected optically by an image recording device of a measuring head in order to be able to access the measurement panel information of the respective measurement panel. Measurement panels whose measurement panel information has been assigned to an identification pattern in the manner described can be mounted on the wheels of the motor vehicle in any permutation, i.e. each measurement panel can be mounted on any wheel of the motor vehicle as desired, since the respective measurement panel information can be retrieved and uniquely assigned to the respective measurement panel on the basis of the identification target optically detectable by an image recording device of a measuring head.

In this way, the implementation of the wheel alignment measurement can be further simplified; and the susceptibility to errors can be significantly reduced, since errors that can result from an incorrect assignment of the measurement panels to the wheels of the motor vehicle are reliably avoided.

In the following, an exemplary embodiment of the invention will be explained in more detail with reference to the accompanying figures.

Figure 1:
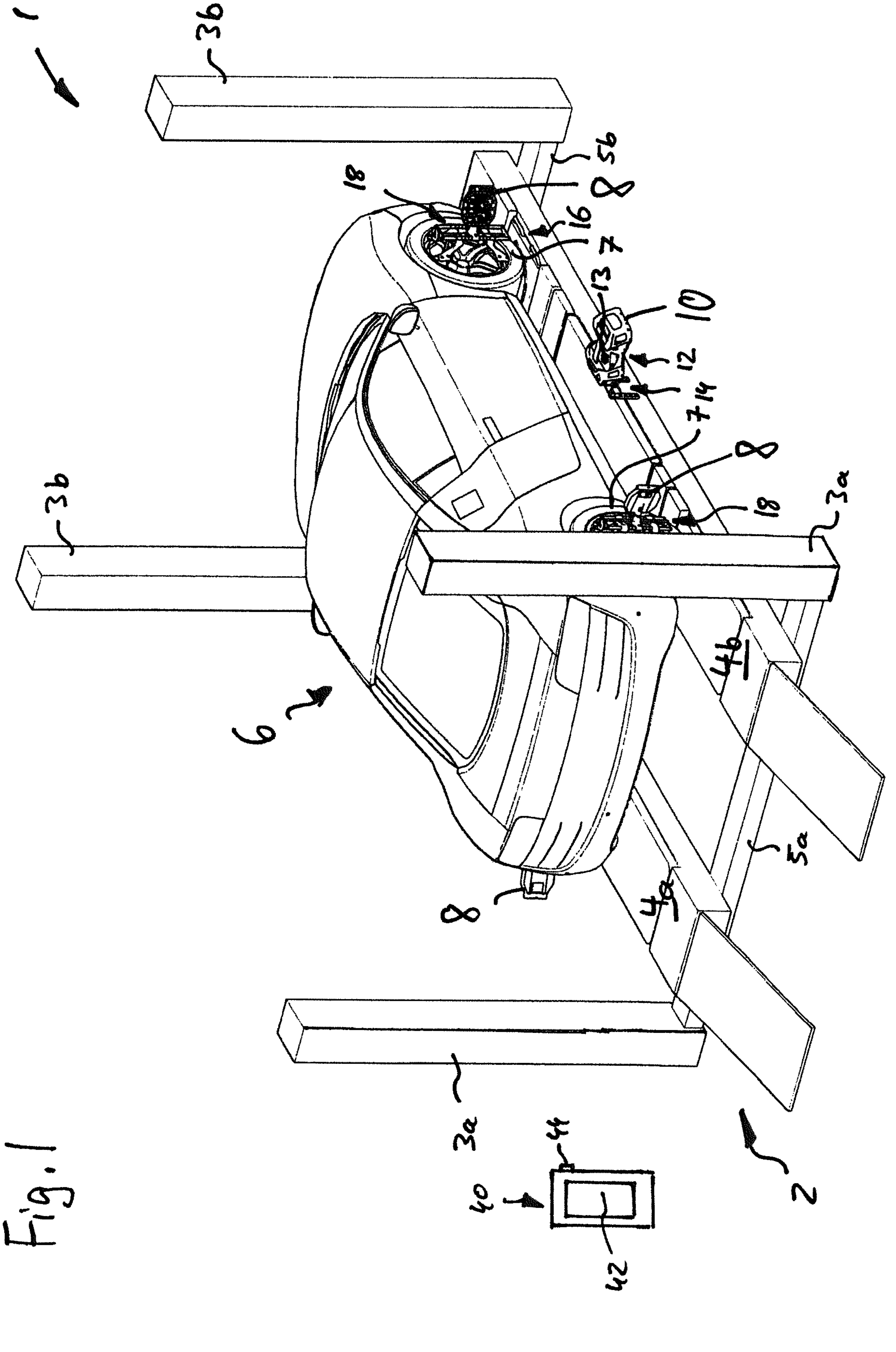
FIG. 1 shows a perspective view of a motor vehicle standing on a lifting platform with measurement panels attached to the wheels of the motor vehicle and a measuring head mounted laterally next to the running rails.

FIG. 1 shows a perspective view of a measuring station 1 equipped with a lifting platform 2 with a motor vehicle 6 standing thereon.

The lifting platform 2 has four columns 3*a*, 3*b*, namely two rear columns 3*a* and two front columns 3*b*, a rear cross member 5*a* and a front cross member 5*b*, each extending between the two front and the two rear columns 3*a*, 3*b*. A left and a right running rail 4*a*, 4*b* rest on the cross members 5*a*, 5*b*. By lifting the cross members 5*a*, 5*b*, the running rails 4*a*, 4*b* and the motor vehicle 6 standing thereon can be raised.

A measurement panel 8 designed according to the invention is attached to each of the four wheels 7 of the motor vehicle 6 by means of a wheel adapter 18. In the perspective view of FIG. 1, only two wheels 7 of the motor vehicle 6, namely the two wheels 7 on the right side of the motor vehicle 6, and three of the four measurement panels 8 are visible.

The front wheels 7 of the motor vehicle 6 are positioned on turn plates 16, which allow steering angles of the front wheels 7.

A measuring head 10 is mounted on each of the right (outer) side of the right-hand running rail 4*b* (and likewise on the outer left side of the left-hand running rail 4*a*, which is, however, concealed by the motor vehicle 6).

The measuring heads 10 are attached to the two running rails 4*a*, 4*b* of the lifting platform 2 by means of suitable attachment means 14. The measuring heads 10 can be attached to the running rails 4*a*, 4*b*, for example, by sliding them onto a respective outwardly directed holding device 14 that is attached to the respective running rail 4*a*, 4*b*.

The measuring head 10 is mounted in an approximately central position with respect to the longitudinal direction of the running rail 4*a*, 4*b* and the vehicle 6, so that a front (non-visible) image recording device of the measuring head 10 can capture an image of the respective measurement panel 8 on the front wheel 7 and a rearwardly directed image recording device 12 of the measuring head 10 can capture an image of the respective measurement panel 8 on the rear wheel 7 of the motor vehicle 6. The image recording devices 12 of the measuring heads 10 may be designed, in particular, as low-cost 2D cameras.

The measuring head 10 also comprises an image processing unit 13 which is designed for processing and evaluating the images captured or recorded by the image recording devices 12.

A reference system comprising a transverse camera and an optically detectable element is provided on the inner sides of the two measuring heads 10 facing the motor vehicle 6, i.e. on the side of each measuring head 10 facing the opposite measuring head 10. Via the reference systems of the two measuring heads 10 located opposite each other in the transverse direction, the measuring heads 10 reference each other in the transverse direction below the motor vehicle 6. Thus, the position and orientation of the measuring heads 10 with respect to each other can be determined, and the recorded images of the measurement panels 8 from both measuring heads 10 can be brought into a common coordinate system.

In addition to the measuring heads 10, a mobile and/or a stationary operating device 40 may be provided, which allows parameters and commands to be input and transferred to the measuring heads 10. The operating device 40 may also comprise a display device 42 that is designed to display measurement results, operating instructions, error messages and/or other information that has been transmitted from the measuring heads 10 to the operating device 40.

In particular, the operating device 40 may have a touch-sensitive screen ("touchscreen") that can be used both as an input device and as a display device 42. Alternatively, the operating device 40 may be formed with a display device (screen) 42 and an input device separate therefrom, for example a keyboard, a mouse and/or a trackball.

The operating device 40 may be equipped furthermore with an image recording device (camera) 44 as well. One possible use of such an image recording device 44 within the scope of the invention will be explained further below.

The operating device 40 may be, for example, a smartphone or tablet PC and communicate with the measuring heads 10 and/or a central computer not shown in the figures via a wired or wireless connection, for example a WLAN or Bluetooth connection. The central computer may be a conventional personal computer or a single board computer, e.g. "Raspberry Pi". The central computer can be designed to be operated as a web server to enable information to be displayed, in particular measurement results, to be displayed through a web browser. In this manner, commercially available devices, in particular smartphones and tablet PCs, can be used as operating and display devices 40.

Figure 2:
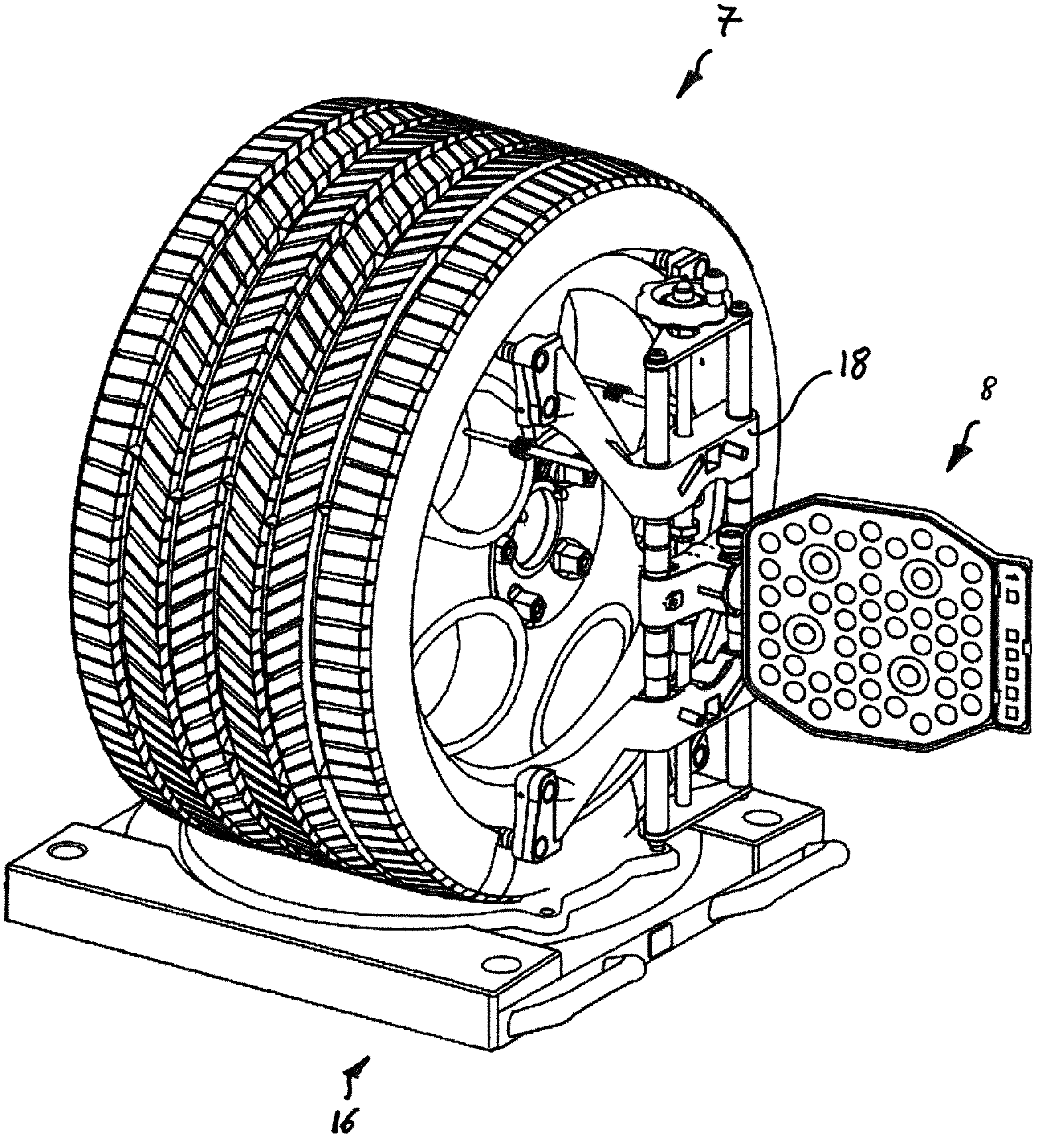
FIG. 2 shows an enlarged front view of a measurement panel according to the invention attached to a wheel of a motor vehicle by means of a wheel adapter.

Although the measuring station 1 shown in FIG. 2 is equipped with a lifting platform 2, measurement panels 8 formed according to the invention can also be used at measuring stations 1 that are not equipped with a lifting platform 2. In particular, the measuring heads 10 can also be attached to running rails 4*a*, 4*b* installed on the floor of a measuring station 1 or placed next to the motor vehicle 6 on the floor of the measuring station 1.

Figure 3:
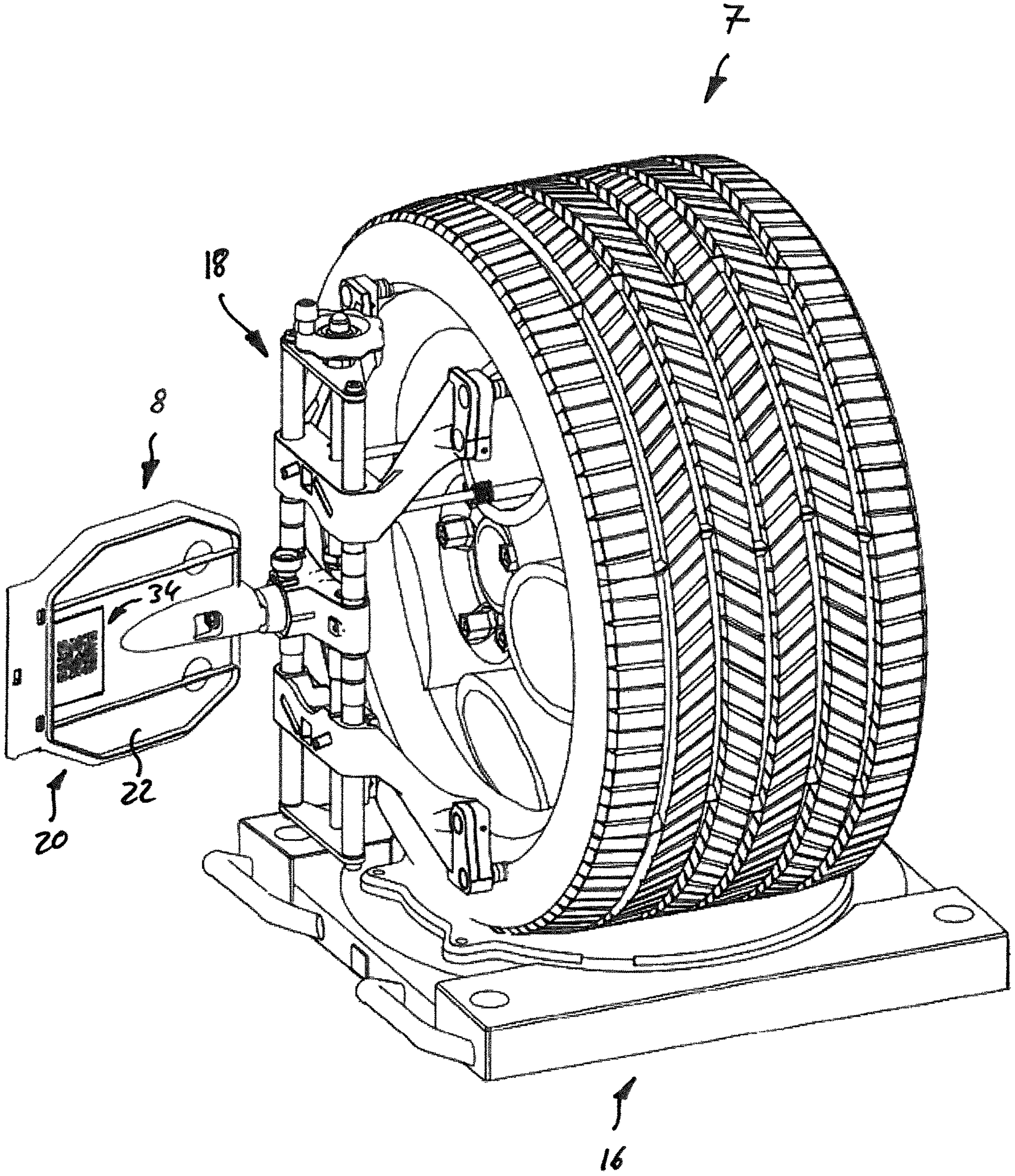
FIG. 3 shows an enlarged rear view of the measurement panel according to the invention attached to a wheel of a motor vehicle by means of a wheel adapter.

FIGS. 2 and 3 show enlarged views of a measurement panel 8 attached to a wheel 7 of the motor vehicle 6 by means of a wheel adapter 18 from the front (FIG. 2) and from the rear (FIG. 3).

Figure 4:
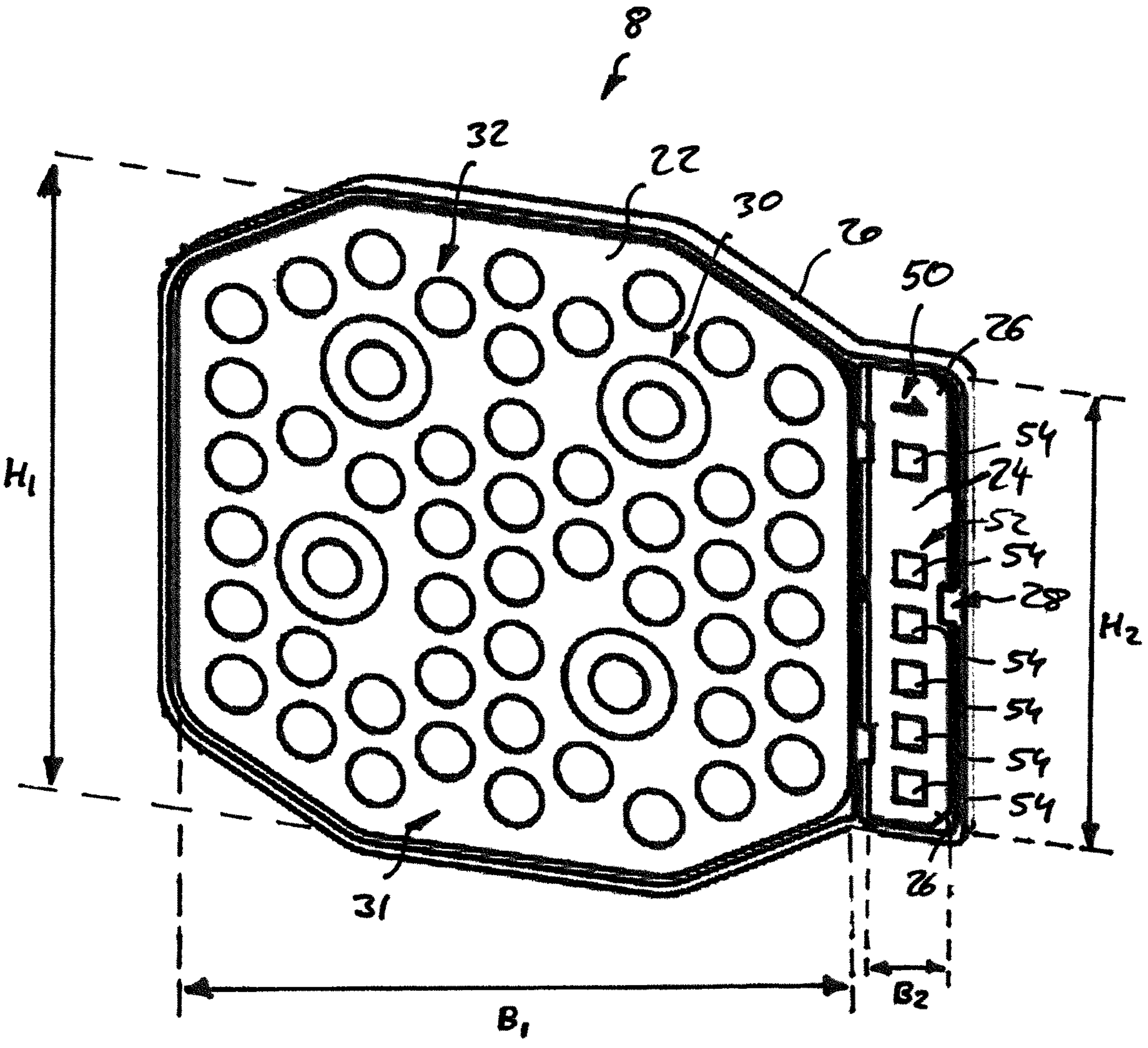
FIG. 4 shows an enlarged front view of the measurement panel according to the invention.
Figure 5:
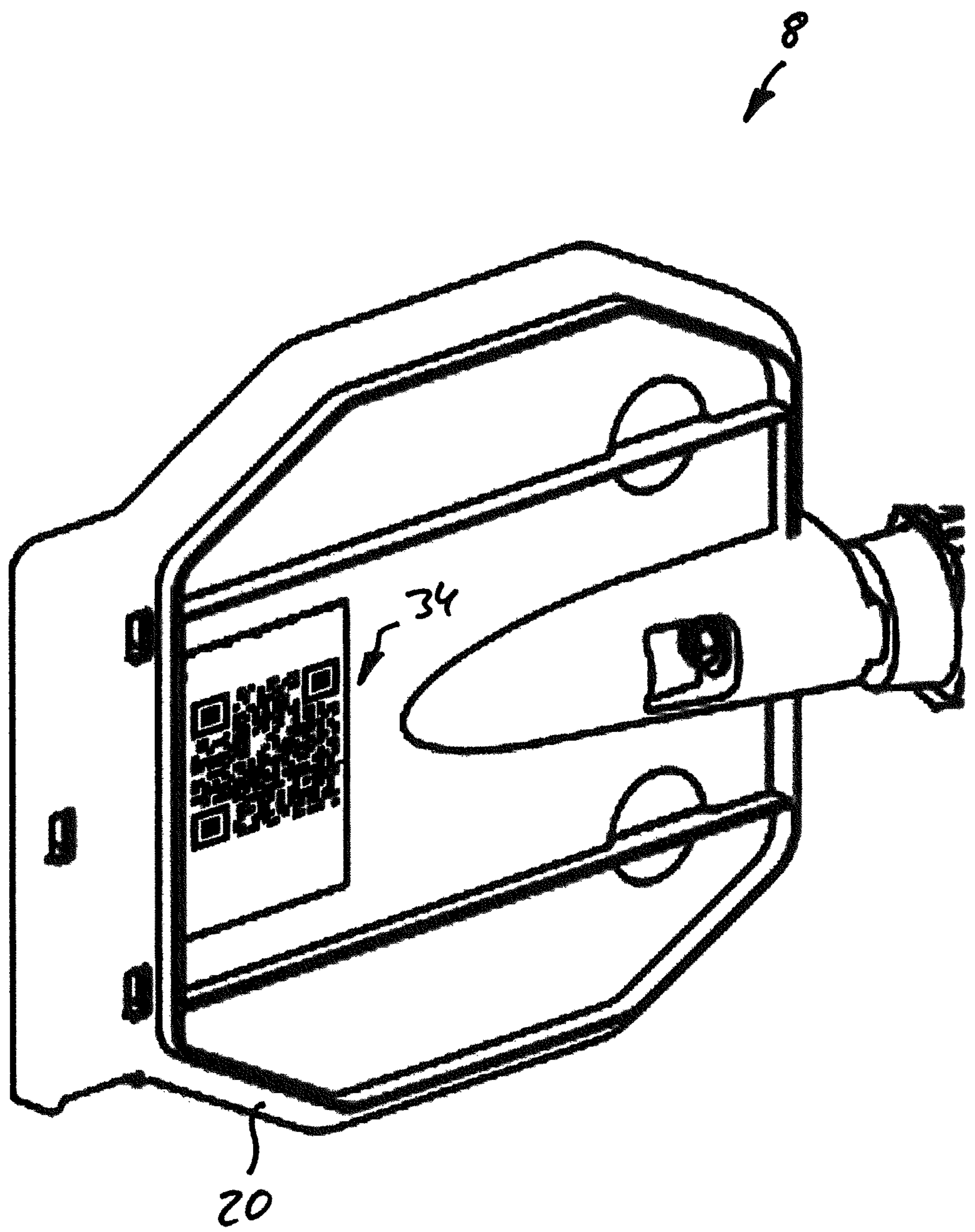
FIG. 5 shows an enlarged rear view of the measurement panel according to the invention.

FIGS. 4 and 5 show enlarged views of a measurement panel 8 according to the invention from the front (FIG. 4) and from the rear (FIG. 5).

The measurement panel 8 has a frame-shaped measurement panel element carrier 20 which can be connected, for example by means of a pluggable connection, to the wheel adapter 18 in order to support the measurement panel 8 on a wheel 7 of the motor vehicle 6.

The measurement panel element carrier 20 carries a first measurement panel element 22 and a second measurement panel element 24. In the exemplary embodiment shown in the figures, the first measurement panel element 22 has a larger surface area than the second measurement panel element 24.

The two measuring panel elements 22, 24 shown in the figures are plate-shaped, i.e. the width $B_1$, $B_2$ and the height $H_1$, $H_2$ of the two measurement panel elements 22, 24 are considerably larger than their thickness, so that the measurement panel elements 22, 24 can be regarded as substantially two-dimensional measurement panel elements 22, 24.

For example, the first measurement panel element 22 has a width $B_1$ and height $H_1$ of between 10 cm and 30 cm each, in particular a width $B_1$ and height $H_1$ of between 15 cm and 25 cm; and the second measurement panel element has a height (length) $H_2$ of between 10 cm and 30 cm and a width $B_2$ of between 5 cm and 10 cm.

The thickness of the measurement panel elements 22, 24 is typically less than 1 cm, in particular less than 0.6 cm.

The first measurement panel element 22 shown in the figures is octagonal in shape with slightly rounded corners. The first measurement panel element 22 is not formed as an equilateral octagon in the shape of a stop sign. Rather, the vertical sides of the first measurement panel element 22 are longer than its horizontal sides. However, the first measurement panel element 22 may have other geometries not shown in the figures.

The second measurement panel element 24 is substantially rectangular in shape with two chamfered corners 26 and a longitudinally central indentation 28.

The measurement panel element carrier 20 is configured such that the second measurement panel element 24 can be disposed in the measurement panel element carrier 20 only in the orientation shown, due to the chamfered corners 26 and the indentation 28. In particular, a protrusion may be formed on the measurement panel element carrier 20, which is arranged in the central indentation 28 when the second measurement panel element 24 is disposed in the measurement panel element carrier 20 in the orientation shown in FIGS. 2 and 4.

The two measurement panel elements 22, 24 can be independently mounted in and removed from the measurement panel element carrier 20. As a result, different first and second measurement panel elements 22, 24 can be combined in arbitrary manner in a measurement panel element carrier 20 to form a measurement panel 8.

For example, the measurement panel elements 22, 24 can be slidably inserted into the measurement panel element carrier 20 and/or locked in place in the measurement panel element carrier 20 using snap-in connections.

A two-dimensional measurement mark pattern 31 comprising a number of two-dimensional optical features, e.g. measurement marks, 30, 32, is formed on the front side of the first measurement panel element 22 visible in FIGS. 2 and 4, which faces one of the measuring heads 10 during measuring operation. The optical features 30, 32 can be formed, for example, as bright measurement marks 30, 32, in particular as light-reflecting retro-reflective marks, on a black background.

In the exemplary embodiment shown in the figures, the optical features 30, 32 are formed in a circular or disk-shaped configuration. However, other optical features not shown in the figures are possible as well. The only condition for an optical feature or a measurement mark pattern is that its parameters, such as a position, can be determined algorithmically upon optical detection.

In order to be able to perform the wheel alignment measurement with the required accuracy, certain parameters of the optical features 30, 32, such as their positions, must be known with high accuracy. Since the measurement mark patterns 31 can be manufactured with certain tolerances only, the required accuracy in the manufacture of the measurement mark patterns 31 cannot be guaranteed. Therefore, the measurement mark patterns 31 are measured with high accuracy after the first measuring panel elements 22 are manufactured, so that the parameters of the measurement mark patterns 31 can be provided with the required accuracy.

The parameters of the measurement mark patterns 31 thus determined are encoded in an optically detectable information carrier 34, in particular in a bar code or QR code 34. The optically detectable information carrier 34 thus generated is attached to or formed on the rear side of the respective first measurement panel element 22, as can be seen in FIGS. 3 and 5.

The optically detectable information carrier 34 may be applied, for example, as a sticker to the rear side of the respective first measurement panel element 22 or may be printed directly on the rear side of the respective first measurement panel element 22.

The parameters of the measurement mark patterns 31 can be determined, in particular, in the form of the deviations (differences) of the measured parameters from predetermined reference parameters and can thus be encoded in the optically detectable information carrier 34 in a space-saving manner.

By reading-in the optically detectable information carrier 34, the parameters of the measurement mark patterns 31 of the first measurement panel element 22 can be made known to the measuring heads 10.

In an exemplary embodiment, the measurement panels 8 or first measurement panel elements 22 are positioned in front of a measuring head 10 for this purpose before the start of the actual measurement such that the optically detectable information carrier 34 formed on the rear side of the respective first measurement panel element 22 can be optically detected by an image recording device 12 of the measuring head 10. The optically detectable information carrier 34 can then be read and evaluated by the measuring head 10.

Alternatively, the optically detectable information carrier 34 can be detected and evaluated by an external/mobile image recording device 44, in particular by means of the camera 44 of a mobile operating device 40 (see FIG. 1).

Since the optically detectable information carrier 34 is formed on the rear side of the respective first measurement panel element 22 according to the invention, the optically detectable information carrier 34 does not overlap with the measurement mark pattern 31 formed on the front side of the respective first measurement panel element 22 and does not take up any additional space on the front side of the respective first measurement panel element 22.

Therefore, the optically detectable information carrier 34 and the measurement mark pattern 31 can be formed on the measurement panel element 22 independently of each other, and the optically detectable information carrier 34 can be formed in a size that is advantageous for encoding the parameters and for good recognizability of the optically readable code 34, without the dimensions of the first measurement panel element 22 having to be increased for this purpose or space being lost for the measurement mark pattern 31 formed on the front surface of the respective first measurement panel element 22.

For avoiding that the optically detectable information carrier 34 has to be read in again before each vehicle measurement in order to transmit the parameters of the measurement mark pattern 31 of the respective measurement panel element 22 to the measuring head 10, the parameters of the measurement mark pattern 31 stored in the optically detectable information carrier 34 can be assigned to an identification pattern 52 formed on a second measurement panel element 24.

For this purpose, the optically detectable information carrier 34, as described above, is first optically detected by an image recording device 12, 44, in particular the image recording device 12, 44 of a measuring head 10 or a mobile operating device 40. Then, the parameters encoded in the optically detectable information carrier 34 are assigned to the identification pattern 52 of a second measuring element 24 associated with the first measuring element 22 and arranged together with the first measuring element 22 in the same measuring element carrier 20.

This assignment may be effected by also detecting the identification pattern 52 of the second measurement panel element 24 associated with the first measurement panel element 22 by means an image recording device 12, 44. This image recording device 12, 44 may be the same image recording device 12, 44 that previously detected the optically detectable information carrier 34. However, two different image recording devices 12, 44 may be used for optically detecting the identification pattern 52 and for detecting the optically detectable information carrier 34.

As an alternative, the parameters encoded in the optically detectable information carrier 34 can be assigned to the identification pattern 52 of a second measurement panel element 24 by manually entering a code 50 uniquely identifying the second measurement panel element 24, in particular a number or letter formed on the second measurement panel element 24, into the operating device 40.

For each subsequent measurement of the motor vehicle 6, the identification pattern 52 formed on the second measurement panel element 24 is then optically detected by an image recording device 12 of the measuring head 10, so that the measuring head 10 can use the detected identification pattern 52 to access the parameters of the first measurement panel element 22 associated with the detected identification pattern 52 that are stored for the detected identification pattern 52.

As long as the mutual assignment of the first and second measurement panel elements 22, 24 and thus the assignment of the parameters of the measurement panel patterns 31 formed on the first measurement panel elements 22 to the associated identification patterns 52 is maintained, the measurement panels 8 can be attached in any permutation to the wheels 7 of the motor vehicle 6. Based on the identification patterns detected by the cameras 12 of the measuring heads 10, the measuring heads 10 can recognize which measurement panel 8 is mounted on which wheel 7 of the motor vehicle 6 and thus retrieve the parameters stored for the measurement mark pattern 31 of the respective measurement panel 8 and use them in the subsequent wheel alignment measurement.

It is also possible to provide more than four different measurement panels 8 with different identification patterns 52 for one or more measuring stations 1, with the measurement mark pattern 31 of each measurement panel 8 being assigned to a different identification pattern 52. In this way, more than four different measurement panel elements 22 can be used at one or more measuring stations 1, for example adjacent to each other, without an incorrect assignment of the first measurement panel elements 22 and thus incorrect measurement results being caused.

In the exemplary embodiment shown in the figures, the identification pattern 52 comprises a number of identification pattern marks 54 arranged equidistantly, i.e. at equal distances from each other, along a row. Like the optical features 30, 32, the identification pattern marks 54 may be light-reflective retro-reflective marks.

In the exemplary embodiment shown in the figures, the identification pattern marks 54 are formed as squares and arranged in a vertical row on an outer side of the measurement panel 8 facing away from the vehicle 6.

The identification pattern marks 54 may also have other geometric shapes, for example rectangles, squares or ellipses. It is advantageous if the identification pattern marks 54 have a different geometric shape and/or size than the optical features 30, 32 formed on the first measurement panel elements 22, so that they can be clearly distinguished therefrom.

The identification pattern marks 54 may also be arranged in a different geometric arrangement than in a vertical row, for example in a horizontal row above or below the first measurement panel element 22, or in any other arrangement.

In the exemplary embodiment shown in the figures, the second measurement panel elements 24 are uniquely encoded in that at least one of the identification pattern marks 54 is missing from the equidistant row of identification pattern marks 54. In this way, the second measurement panel elements 24 can be uniquely and reliably encoded, recognized and identified. However, other types of arrangement/coding of the identification pattern marks 54 are also possible, which enable the second measurement panel elements 24 to be uniquely identified and distinguished.

The proposed design of the measurement panels 8 with two, first and second, measurement panel elements 22, 24 that can be combined with each other as desired enables flexible handling of the measurement panel elements 22 in workshop use. In particular, the first measurement panel elements 22, during manufacture and measurement thereof, do not yet have to be assigned to one of the wheels 7 (front/rear, right/left) of a motor vehicle 6 to be measured.

First measurement panel elements 22 according to the invention are precisely measured after their manufacture, and the parameters of the measurement panel pattern 31 formed on the respective first measurement panel element 22 are stored in an optically readable code formed on the rear side of the first measurement panel element 22.

Only at the place of use/measuring station 1 does the above-described assignment of the first measurement panel elements 22 to one of the second measurement panel elements 24 take place. The pairs of mutually assigned first and second measurement panel elements 22, 24 are arranged together in a measurement panel element carrier 20 and thus form a measurement panel 8 which can be used for vehicle measurement.

Due to the flexible assignment of the first and second measurement panel elements 22, 24, which does not take place during manufacture but only at the measurement station 1, measurement panel elements 22, 24 can be easily exchanged, for example when they are damaged or are to be replaced by measurement panel elements 22, 24 with other measurement mark patterns 31 due to changed requirements.

LIST OF REFERENCE NUMERALS

1 measuring station
2 lifting platform
3*a* rear column
3*b* front column
4*a* right running rail
4*a* left running rail
5*a* rear cross member
5*b* front cross member
6 motor vehicle
7 wheel
8 measurement panel
10 measuring head
12 image recording device
13 image processing unit
14 holding device
16 turn plate
18 wheel adapter
20 measurement panel element carrier
22 first measurement panel element
24 second measurement panel element
26 chamfered corner
28 central indentation
30 optical feature
31 measurement mark pattern
32 optical feature
34 optically detectable information carrier
40 operating device
42 display device
44 mobile image recording device
50 identifier
52 identification pattern
54 identification elements

The invention claimed is:

1. A measurement panel for an optical measurement or calibration of a vehicle component, in particular of a wheel system or driver assistance system, the measurement panel comprising:

at least one optical feature being formed on or attached to a front side of the measurement panel; and at least one optically detectable information carrier of measurement panel information relating to the measurement panel itself, wherein the at least one optically detectable information carrier is formed on or attached to a rear side of the measurement panel;

wherein at least one identification pattern is additionally formed on the front side of the measurement panel, which enables the measurement panel to be identified by means of an image recording device directed towards the front side of the measurement panel; and wherein the measurement panel comprises a first measurement pane element and a second measurement panel element formed separately from the first measurement panel element, the at least one optical feature and the at least one optically detectable formation carrier are formed on the first measurement panel element, and the at least one identification pattern is formed on the second measurement panel element.

2. The measurement panel according to claim 1, characterized in that the measurement panel information is at least one of a group comprising: an individual identifier of the measurement panel, geometric dimensions of the measurement panel, geometric dimensions of the at least one optical feature formed on the measurement panel, parameters of the measurement panel and/or the at least one optical feature formed thereon, optical properties of the measurement panel and/or the at least one optical feature formed thereon.

3. The measurement panel according to claim 2, characterized in that the measurement panel information is encoded in the at least one optically detectable information carrier, the measurement panel information being encoded in the at least one optically detectable information carrier in particular in compressed form.

4. A wheel adapter, comprising the measurement panel according to claim 2, wherein the wheel adapter is configured to be attached to a wheel of a motor vehicle.

5. The measurement panel according to claim 1, characterized in that the measurement panel information is encoded in the at least one optically detectable information carrier, the measurement panel information being encoded in the at least one optically detectable information carrier in particular in compressed form.

6. The measurement panel according to claim 5, characterized in that the measurement panel information is encoded in a machine-readable form in the at least one optically detectable information carrier, the machine-readable form including at least one element of the group comprising: alphanumeric symbols or the like, a one-dimensional code, in particular a bar code, or a two-dimensional code, in particular a QR code, or a combination thereof.

7. The measurement panel according to claim 1, wherein the at least one identification pattern comprises a plurality of geometric identification elements, in particular circles or polygons, wherein the at least one identification pattern comprises in particular a plurality of like geometric identification elements.

8. The measurement panel according to claim 7, wherein the geometric identification elements are formed on the measurement panel in a measurement panel-specific number and/or are arranged on the measurement panel in a measurement panel-specific arrangement, wherein the geometric identification elements are arranged on the measurement panel in particular in a vertically or horizontally or diagonally or obliquely aligned row.

9. The measurement panel according to claim 1, wherein the measurement panel comprises a measurement panel element carrier adapted to receive the first and second measurement panel elements; wherein the first and second measurement panel elements are attachable to and detachable from the measurement panel element carrier independently of each other.

10. The measurement panel according to claim 1, wherein the measurement panel has a frame-shaped measurement panel carrier that carries the first measurement panel element and the second measurement panel element.

11. The measurement panel according to claim 1, wherein each of the first and second measurement panel elements is plate-shaped.

12. The measurement panel according to claim 11, wherein the measurement panel has a frame-shaped measurement panel carrier that carries the first measurement panel element and the second measurement measurement panel element so that the first and second measurement panel elements extend substantially in a common plane.

13. A wheel adapter comprising the measurement panel according to claim 1, wherein the wheel adapter is configured to be attached to a wheel of a motor vehicle.

14. A device for the optical measurement and/or calibration of the vehicle component, in particular the wheel system or driver assistance system, comprising:

at least one image recording device, at least one image processing unit and at least one measurement panel according to claim 1, wherein the at least one measurement panel can be attached to a wheel of a motor vehicle, in particular by means of a wheel adapter, and wherein the at least one image recording device is configured to capture an image of the at least one optically detectable information carrier of the at least one measurement panel and to transmit the image captured to the at least one image processing unit, and wherein the at least one image processing unit is adapted to decode the measurement panel information from the image captured of the at least one optically detectable information carrier by means of image processing and to use the measurement panel information decoded in a subsequent measurement and/or calibration.

15. The device according to claim 14, wherein the device comprises a mobile image recording device adapted to capture the image of the at least one optically detectable information carrier.

16. A method for the optical measurement or calibration of a vehicle component, in particular the wheel system or driver assistance system, using at least one measurement panel according to claim 1, the method comprising the steps of:

attaching the at least one measurement panel to a wheel of a motor vehicle or to a measuring means required for the calibration of a driver assistance system;

capturing an image of the at least one optically detectable information carrier;

recognizing and decoding the measurement panel information contained in the image of the at least one optically detectable information carrier, capturing at least one image of the at least one optical feature; and using the measurement panel information in the measurement or calibration of the vehicle component by means of the at least one captured image of the at least one optical feature.

17. The method according to claim 16, wherein the method comprises capturing the at least one image of the at least one optical feature by means of a stationary image recording device of a device for the optical measurement and/or calibration of a vehicle component.

18. The method according to claim 17, wherein the method comprises furthermore:

assigning the measurement panel information contained in the at least one optically detectable information carrier to an identification pattern;

capturing an image of the identification pattern;

identifying the at least one measurement pane by means of the captured image of the identification pattern; and assigning the measurement panel information contained in the at least one optically detectable information carrier to the measurement panel identified by means of the identification pattern.

19. The method according to claim 16, wherein the method comprises capturing the at least one image of the at least one optically detectable information carrier by means of a stationary image recording device of a device for the optical measurement and/or calibration of a vehicle component or by means of a mobile image recording device, in particular a camera of a mobile operating device, such as a smartphone or a tablet PC.

20. The method according to claim 16, wherein the method comprises furthermore:

assigning the measurement panel information contained in the at least one optically detectable information carrier to an identification pattern;

capturing an image of the identification pattern;

identifying the at least one measurement panel by means of the captured image of the identification pattern; and assigning the measurement panel information contained in the at least one optically detectable information carrier to the measurement panel identified by means of the identification pattern.

* * * * *